July 8, 1952          S. SILBERKRAUS          2,602,192

PROCESS FOR MOLDING BUTTONS HAVING MULTICOLORED SURFACES

Filed April 8, 1948

INVENTOR.
Sam Silberkraus
BY
*Faukenbach Hirschm*
ATTORNEYS

UNITED STATES PATENT OFFICE 2,602,192

PROCESS FOR MOLDING BUTTONS HAVING MULTICOLORED SURFACES

Sam Silberkraus, Riverdale, N. Y., assignor to Regal Moulding Co., Inc., Mineola, N. Y., a corporation of New York Application April 8, 1948, Serial No. 19,673

3 Claims. (Cl. 18—55)

The present invention relates to a process for producing molded articles having variegated color or shaded color effects, yielding mottled surfaces, and relates more particularly to the manufacture of mottled articles from pre-formed pills, tablets, or blanks.

The invention is of particular utility in connection with the manufacture of buttons having mottled surfaces, and especially broached buttons having multi-color or shaded color effects, and it will therefore be described in detail in connection with the manufacture of such articles, although the invention, as will be recognized by those skilled in the art, is applicable to the manufacture of other molded articles wherein similar effects are desired.

In the manufacture of buttons and similar articles having a mottled or multi-colored surface, it has heretofore been the practice, first, to form a blank, sometimes termed a "pill," or tablet, of suitable thermosetting or thermoplastic material, and to spray such blank with a solution of a dye stuff or a suspension of a pigment, after which the blank is molded to the desired shape by heat and pressure. See, for example, the patent to Broderson, No. 2,208,494. As described in such patent, variegated effects may be obtained by forming the blank with an intaglio or relief design, so that the amount of coloring solution or suspension retained by different portions of the blank, is varied.

So far as I am aware, the production of multicolor effects by the application of coloring material to a pre-formed button blank or the like, has in actual commercial practice been restricted to the spraying on of a coloring liquid. This procedure has suffered from a number of disadvantages. In the first place, it has failed to produce uniformly mottled effects, so that a large number of articles have had to be discarded for failure to match a selected pattern. Also, the spraying operation is rather messy, requires considerable skill, and must be necessarily performed at some distance from the mold, so that time is lost and labor must be expended in the transportation of the blanks, both before and after the spraying operation. Finally, further time is lost in the necessary step of drying the applied liquid coloring matter, especially where relatively deep grooves in an intaglio design are filled with the coloring liquid.

It has also been proposed to produce multicolor effects by first forming a blank with an intaglio design, overlaying such design with a continuous and solid layer of thermosetting resin of contrasting coloring, heat and pressure molding the composite article to the final, hard, and infusible state, and thereafter removing surplus material by grinding or cutting, so as to expose the surface of the material of the original blank adjacent to the grooves of the intaglio design which have become filled with the applied layer of resin of contrasting color. See the patent to Nast, No. 2,244,565. This process, however, is quite expensive by reason of the necessity for removing the excess of the second layer of resin, and because of the loss of such removed material.

With the processes of manufacture of molded buttons now in general use, it has not proved practicable to produce broached buttons because the lugs in the die cavity designed to form the sewing or thread holes, tend to break the sprayed surface of the blank or tablet in such a manner that undesirable effects are produced. For this reason, it has been the general practice to produce unperforated buttons in the case of the molded variety, and to produce the sewing holes by drilling which has necessarily increased the cost of manufacture. In fact, breakage occurred even with unperforated buttons.

The present invention has for its general object the provision of a process wherein multi-color effects are produced with a high degree of regularity of pattern, and with a single heat and pressure molding step.

More specifically, it is an object of the present invention to provide a process for the manufacture of buttons and similar articles having a multi-colored or mottled surface without use of liquid coloring materials, and without the use of excessive amounts of a resinous material which require removal after the molding of the article.

It is a further object of the invention to provide an improved process of the type indicated, wherein multi-color effects are obtained by the use of a granular or powdered thermosetting molding material, compatible with that of the blank, and being of contrasting color with respect to the material of the blank.

Still another object of the invention is to provide a process for the manufacture of articles of the type indicated, wherein visibly different surface smoothness in different areas, combined, if desired, with multi-color effects, are obtained by the use of molding materials of different grain sizes which may also be of different colors.

Still another object of the invention is to provide a process whereby a high degree of uniformity of color and pattern is obtained, not only in articles of the same size, but also in the whole range of sizes in any particular color.

It is also an object of the invention to devise a process for the manufacture of buttons having sewing or thread holes formed therein by a broaching, thereby eliminating the conventional subsequent drilling operation, the process being characterized by the substantial elimination of the danger of "pill break" or cracking of the blank followed by imperfect fusion of the parts during the molding.

In accordance with the present invention, multi-color or mottled effects are obtained by the use of resinous molding powders which are applied to a pre-formed blank or tablet in the manner described hereinbelow, while visible variations in the degree of surface smoothness are produced by employing molding powders of different grain sizes for the original blank and for the molding material dusted on or otherwise applied to such blank pursuant to the present invention. The multi-color effects may be obtained with either a blank having a continuous more or less flat surface, or with a blank having an intaglio or relief pattern. In the case of a flat blank, the molding material is applied only to selected areas of the blank in accordance with a predetermined pattern, and preferably is dusted on to the blank through a suitable pattern stencil. Where the tablet is engraved with either an intaglio or relief design, the molding material is dusted over the blank, preferably through a stencil, in such a way that the molding powder extends to the same level substantially over the whole surface of the blank. In the first case, multi-color effects are obtained by using a molding powder of contrasting coloring and by proper distribution of the molding powder, mottled effects according to a desired pattern are obtained. In the second case, the desired color effects arise from the fact that the material dusted on the surface of the engraved tablet is present in various thicknesses over the areas of the article, so that different intensities of shade of color are produced.

I have found that pleasing smoothness variations can be obtained by utilizing molding powders of different grain size for the tablet itself, and for the dusted-on material. Thus, by employing a relatively coarse-grained powder for the tablet, a background of relatively low smoothness is provided; while if the dusted-on powder is of relatively fine grain, the areas covered by such powder will have a higher smoothness. Hence, where only variations in smoothness are desired, the dusted-on powder will be of the same color and constitution as the material used for making the tablet, but will differ from it only in grain size; whereas if a combined mottled color and variegated smoothness effects are desired, the dusted-on molding powder will differ both in color and in grain size from the material employed for making the blank.

The molding powders employed both for the tablet and the superimposed design are preferably of the thermosetting type, represented, for example, by urea-formaldehyde and phenol-formaldehyde resins and other known resins, although thermoplastic materials can be employed for certain articles. It is essential only that the molding materials employed be capable of being rendered plastic by heat and pressure and be compatible with each other, so that they will fuse together in the molding operation.

The molding materials utilized in preparing the blank and in producing the desired pattern effects can have grain sizes over quite a large range, provided only that there is a sufficient difference in grain size to produce variegated smoothness effects when such are desired. I have found the following grain sizes to be satisfactory, both from the standpoint of availability and of adequate smoothness contrast: For the blank or tablet, approximately 16–20 mesh; for the dusted-on molding powder, 80 mesh and above, preferably 100–200 mesh.

By the use of relatively coarse-grained thermosetting molding material for the tablets, an important advantage is secured in that such material is free-flowing in character. Thereby the difficulties heretofore encountered in the tabletting equipment arising from the lack of dry flow in the finely powdered molding material employed in making the tablets, are avoided. By the use of molding powders of different grain size, therefore, a button can be manufactured in accordance with the present invention by first forming a blank with a coarse-grained molding material and overlaying such tablet with either a uniform or non-uniform layer of molding powder of different grain size over the entire surface of the blank, so that a highly lustrous and smooth surface may be provided for a core or base, which otherwise would have a lower degree of luster and smoothness. In other words, the present invention makes it possible to produce buttons having the highest possible degree of luster and smoothness, whether of solid color or not, while yet securing the advantages arising from the use of coarse-grained material in making the blank.

In the molding of pre-formed blanks or tablets, a condition known as "pill break" is often encountered. This condition manifests itself in molded pieces by a wrinkled appearance at the point at which the tablet is broken or cracked during the closing of the mold.

A further advantage resulting from the use of a layer of comminuted plastic material over the blank, is that such layer acts to cushion the shaping die during the molding operation to such an extent that the cracking or fissuring of the surface of the blank heretofore encountered in the manufacture of buttons, is eliminated. The present process accordingly makes it possible to produce buttons having a mottled color effect or areas of different luster, or both, without the losses heretofore suffered in the manufacture of both unperforated and broached mottled buttons.

The blank or tablet employed in the present invention is formed in the usual manner by compressing a suitable molding powder of thermosensitive plastic material, the compression being sufficient to give the blank enough strength to withstand the several handlings before it is finally dropped into the mold cavity; any degree of heat to which it may be subjected is such that its thermosensitive character is not materially affected.

The accompanying drawing illustrates several modes of carrying out the invention but it will be understood that these are presented only by way of illustration and do not exhaust the variations possible within the scope of the appended claims. In said drawing, Fig. 1 is a plan view of a tablet made of coarser grains of molding material having a uniform layer of a molding powder of finer grain over its entire area;

In carrying out the process of the present invention, the pre-formed blanks, whether of the plain surface or of the intaglio or relief design type, may be positioned in a conventional molding board composed of two plates having registering openings of only slightly larger diameter than that of the buttons or other articles to be manufactured and movable relatively to each other, so that during the positioning of the articles in the aperture of the upper plate, they are held from falling through by portions of the lower plate. As is known in the art, the perforations have the same spacing as the cavities of the mold, so that after the molding board is placed with the apertures of the upper plate in registry with the mold cavities, the lower plate can be manipulated to bring its apertures in complete registry with those of the upper plate to cause the articles to fall through into the mold cavities.

After the articles have been positioned in the apertures of the molding board in the region of the mold, and even while the board is in its proper position over the mold cavities, the molding powder which is to produce the variegated luster and/or color effects, is applied to the exposed surface of the blanks. While such powder can be distributed over the blanks from a suitable container or hopper, I prefer to dust the molding powder on to the blanks by way of a stencil which is apertured to produce the desired pattern distribution over the blanks. This stencil may be separate from the molding board itself, but I prefer to employ the combined molding board and stencil described in the application filed jointly by me and George Trojanowski simultaneously herewith and entitled "Stencilling Apparatus," Serial No. 19,672 now U. S. Patent No. 2,572,771.

Figure 1:
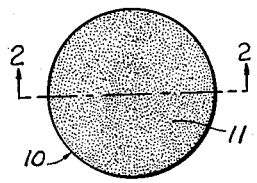
Figure 2:
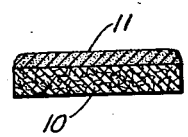
Fig. 2 is a section along the line 2—2 of Fig. 1.
Figure 3:
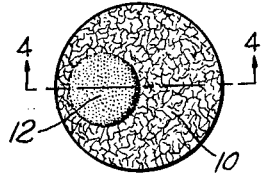
Fig. 3 shows a blank having a mass of molding powder positioned upon its surface in accordance with a pre-formed pattern.
Figure 4:
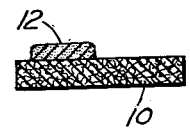
Fig. 4 is a section along the line 4—4 of Fig. 3.
Figure 5:
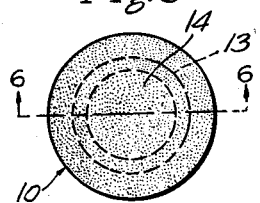
Fig. 5 shows a blank with an intaglio pattern having a mass of molding powder over its surface to uniform level.
Figure 6:
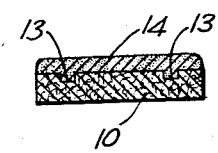
Fig. 6 represents a section along the line 6—6 of Fig. 5.

By means of such stenciling device, there can be applied dusted uniformly, over the whole surface of the blank 10 shown in Figs. 1 and 2, a layer 11 of molding powder of finer grain than that used for preparing the blank 10, or of different color or both. In this case the apertures in the stencil will be of the same size and shape as those of the molding board. When, however, it is desired to produce contrasting effects on the surface of the article, the stencil will be suitably apertured in such a manner that the molding powder, whether of the same grain size or not as the powder employed for preparing the tablet, is distributed only over limited areas of the blank. For the sake of simplicity, the design in Figs. 3 and 4 has been made to consist merely of a small circular area 12 disposed eccentrically on the blank 10. In Figs. 5 and 6, there is shown a blank having an intaglio design in the form of a circular groove 13, the whole tablet being covered with a layer 14 of molding powder up to a uniform level, so that different shades of color are obtained by reason of the greater depth of the molding powder at the groove 13. The stencil will in this case have apertures of the same size and shape as those in the molding board.

It will be seen from the foregoing that by reason of the fact that the dusted-on powder is itself resinous in character and is capable of fusing and blending, during the molding operation, with the resinous material of the blank, the surface of the molded article is integral and uniform in character, the whole top surface of the finished article being composed of resinous material and thus possessing the general properties of such material, namely, smoothness, luster, imperviousness, strength, hardness, etc. In these respects the products of the invention differ essentially from products which are given a pattern or design by the superposition of pigment material over the surface of a resinous blank followed by molding; as in such case the pigment does not form a homogeneous and integral surface, but forms areas of different texture and different degrees of porosity and strength from the resinous surface. It is to be understood that in the process of the present invention, dusted-on resinous powder becomes completely incorporated and blended with the resin of the blank and no subsequent grinding or cutting is necessary to produce the desired multi-color or mottled effect. It will be apparent that the dusted-on resin can be composed of portions of different colors and the different colors can be dusted on successively by the use of different stencils.

As already indicated, the dusted-on resinous powder appears to act as a cushion which eliminates practically completely the "pill break" heretofore encountered. It is possible that where breakage of the tablet occurs on closing of the mold, despite the cushioning action of the dusted-on resinous powder, the latter acts like a welding material to mend the break so that no effects of the break are visible in the finished product. Whatever the actual reason may be, I have found in the commercial practice of my process, that the number of rejects, because of damage by breakage during molding, has been reduced to a negligible value.

While I prefer to employ, as the dusted-on resin, a material of a high degree of fineness, such as 80-mesh and finer, it will be apparent that coarser-grained molding material can, if desired, be employed. The resin of which the dusted-on material is composed, may be the same as that of the blank from the standpoint of chemical constitution, or it may be a resin of a different type, it being necessary only that the materials be capable of adhering strongly to each other or blending with each other, and in general, possess approximately the same molding characteristics. In addition to the specific resins already mentioned, the tablet and dusted-on powder may be composed of melamine-formaldehyde, phenol-furfural, or casein resins, or of any of the various vinyl resins or resins of cellulose origin like cellulose acetate, butyrate, ethers, and the like.

It will be recognized by the process of the present invention there is eliminated a number of the steps heretofore required in the manufacture of mottled buttons. Thus the prior operations of placing the button blanks on a board, spraying the blanks with a solution of a dye, drying the applied liquid and removing the buttons from the spraying board preparatory to locating them in the apertures of a loading board, are completely eliminated. The use of the first board is rendered entirely unnecessary, since the stenciling can be done entirely on the loading board.

Also, the unpleasant odors and poisonous and inflammable vapors of the solvents employed for preparing the dye solutions in prior procedures, are likewise eliminated.

I claim:

1. In a process for molding buttons and the like, the steps which comprise preforming a substantially flat tablet with a thermosetting material of relatively coarse grain size, coating such tablet over at least a portion of its top surface with a thermosetting material of relatively fine grain size, and molding the coated tablet into final shape by fusing the same into a solid, non-porous mass with the aid of heat and pressure.

2. In a process for molding buttons and the like, the steps which comprise preforming a substantially flat tablet with granular thermosetting material having an average grain size of about 16 to 20 mesh, coating such tablet over at least a portion of its top surface with a powdered thermosetting material of finer grain size than said granular material, and molding the coated tablet into final shape by fusing the same into a solid, non-porous mass with the aid of heat and pressure.

3. Process according to claim 1, wherein the tablet is engraved, and wherein the powdered material fills the recesses in the engraved surface to a uniform level.

SAM SILBERKRAUS.

REFERENCES CITED

The following references are of record in the file of this patent:

UNITED STATES PATENTS

| Number | Name | Date |
|---|---|---|
| 1,160,365 | Baekeland | Nov. 16, 1915 |
| 2,087,470 | Davidson et al. | July 20, 1937 |
| 2,208,494 | Broderson | July 16, 1940 |
| 2,234,994 | Vernon | Mar. 18, 1941 |
| 2,297,248 | Rudolph | Sept. 29, 1942 |
| 2,434,477 | Winter | June 13, 1948 |

FOREIGN PATENTS

| Number | Country | Date |
|---|---|---|
| 472,244 | Great Britain | of 1937 |